Patented Aug. 4, 1931

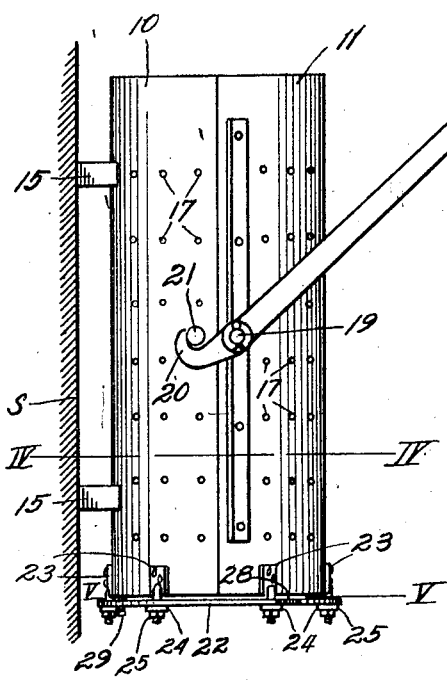
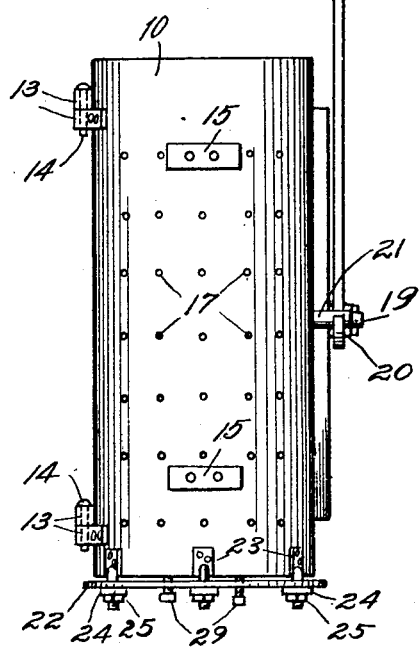
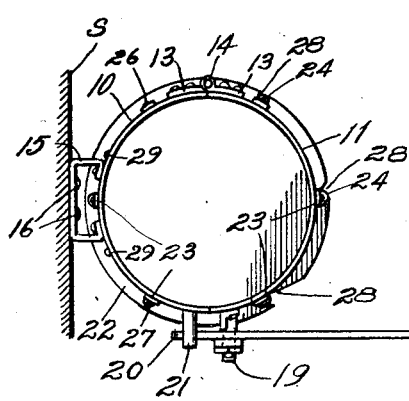

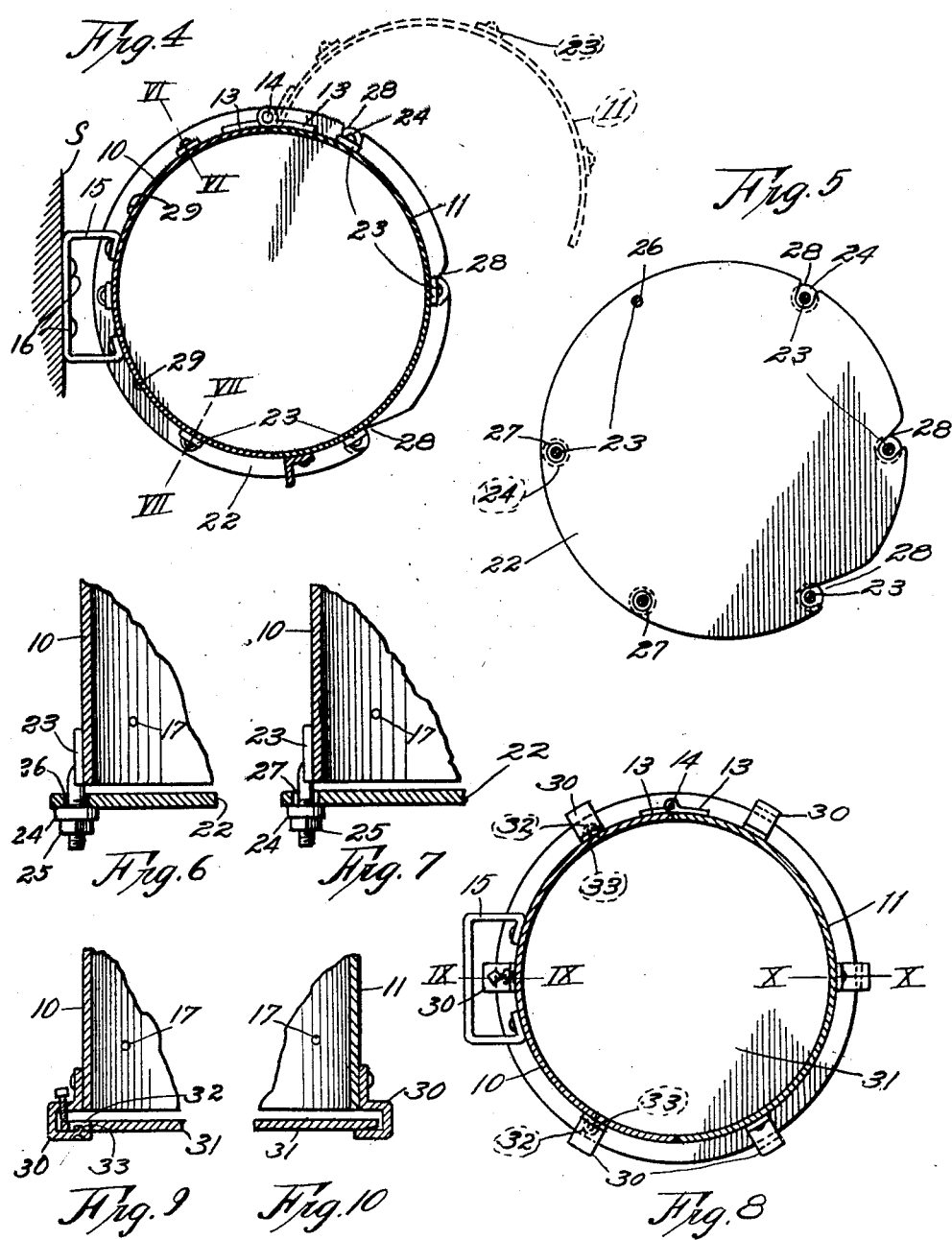

1,817,046

UNITED STATES PATENT OFFICE

WILLIAM G. TWYMAN, OF POTEAU, OKLAHOMA

MOLD FOR GLASS CYLINDERS

Application filed March 28, 1929. Serial No. 350,533.

This invention relates to molds for glass cylinders and particularly to that type in which glass cylinders of substantially uniform diameter and thickness may be easily and quickly blown.

In the manufacture of glass cylinders it is important to have a mold that is not unduly distorted or warped due to the expansion and contraction of the various parts of the mold. Necessarily, the side walls of the mold are cylindrical while the bottom plate is flat and if the bottom plate is securely attached to the side wall member the cylindrical side wall will be distorted and warped out of shape when the unequal expansion and contraction of these parts takes place, thus making it almost impossible to rotate the cylinder in the mold during the process of blowing.

Another difficulty in the blowing of glass cylinders in a mold of this character is the provision of a proper air vent between the side walls and the bottom of the mold.

The present invention provides for a mold in which this unequal expansion and contraction of the parts does not warp or distort the mold, and one in which the space between the side walls and bottom plate is easily adjusted and regulated for different conditions of glass blowing.

The principal object of the present invention is the provision of a mold comprising a pair of semi-cylindrical sections hingedly joined together and a bottom member carried by said sections in such a manner as not to interfere with the free expansion and contraction of the individual member of the mold.

Another object of this invention is the provision of a mold having a bottom member spaced apart from the lower edges of the semi-cylindrical sections and adjustable to and from the same to vary the space therebetween.

Other objects of this invention are simplicity of construction, ease and precision of operation and adaptability to varying conditions incident to glass blowing.

With these general objects in view as well as minor objects which will appear during the course of the detailed specification, reference will now be made to the accompanying drawings, in which;

Figure 1 is a front elevation of a mold for glass cylinders embodying this invention;

Fig. 2 is a side elevation of the same;

Fig. 3 is a plan view of Fig. 1;

Fig. 4 is a horizontal section taken on line IV—IV of Fig. 1;

Fig. 5 is a horizontal section taken on line V—V of Fig. 1;

Fig. 6 is an enlarged fragmentary section taken on line VI—VI of Fig. 4;

Fig. 7 is an enlarged fragmentary sectional view taken on line VII—VII of Fig. 4;

Fig. 8 is a sectional plan view showing a modified form of bottom plate and supporting means therefore;

Fig. 9 is an enlarged sectional view taken on line IX—IX of Fig. 8;

Fig. 10 is an enlarged sectional view taken on line X—X of Fig. 8.

Similar reference characters designate like parts throughout the several views and the numerals 10 and 11 designate cooperating elongated semi-cylindrical half-sections respectively. These half-sections 10 and 11 constitute the side walls of the mold and are hingedly joined together by means of straps 13 and pintles 14. It will be noted that straps 13 on the half-section 11 are so positioned as to rest on top of the straps secured to half section 10 when the lower edges of the two half-sections are in a common plane. Section 10 is rigidly mounted on a suitable support S by means of brackets 15 which are securely attached by riveting or welding to said section and to said support by means of securing members 16. Each of said half-sections are provided with perforations 17 which serve as air vents during the operation of forming the cylinder. The section 11 may be opened and closed relative to the stationary section by means of an operating lever 18 which is pivotally mounted at 19 to section 11. The inner end of lever 18 is provided with a hooked portion 20 which is adapted to engage pin 21 carried by section 10 to secure said half-sections in cooperative relation. When it is desired to move section 11 to the open position, lever 18 is moved upwardly until hook 20 disengages pin 21 and then section 11 may be swung on its hinge to the open position as shown in Fig. 4. This opening must be of sufficient extent to allow the removal of the formed glass cylinder from the mold. While I have shown this simple means for operation and securing section 11 in position, yet it is apparent that many other means might be used.

In order to properly form the glass cylinder it is very essential that a flat base plate perpendicular to the axis of the mold and slightly spaced apart therefrom, be provided. Furthermore, due to the fact that when the heated glass comes in contact with the mold parts during the process of blowing, these parts will expand and contract and it is necessary that each element of the mold be free to expand and contract independently of the other parts. To meet these requirements, the base plate 22 is carried by sections 10 and 11 through the intermediacy of the depending carrying lugs 23 which are securely attached to their respective half-section and threaded at their lower portion to receive bearing nuts 24 and lock nuts 25. One of said carrying lugs mounted on section 10 extends through a hole 26 in base plate 22 with nuts 24 and 25 positioned below said plate. Plate 22 is also provided with enlarged holes 27 in which are mounted other carrying lugs 23. Openings 27 are of sufficient size to permit relative transverse movement between said half section and base member as the parts expand and contract. The portion of the base plate 22 adjacent the lower edge of section 11 is provided with notches 28 which are adapted to receive the carrying lugs 23 securely mounted on section 11. When 11 is in the closed position bearing nuts 24 engage the lower surface of plate 22 to support said plate. With this construction it is apparent that the member 11 may be moved to and from the closed position while the base plate 22 remains in substantially the same relative position to section 10.

To vary the distance between the lower ends of the members 10 and 11 and the base plate 22 in order to obtain the proper air vent I have provided bearing nuts 24 and lock nuts 25 which may be set at any position. These nuts also serve to permit the adjusting of the upper surface of the base plate 22 at right angles to the axis of the mold.

In order to maintain base plate 22 in proper alinement when section 11 is moved to the open position, bearing screws 29 are threaded through plate 22 and bear against the adjacent edge of section 10, thus preventing the tilting of the base plate.

Figs. 8, 9 and 10 are of a modified form in which inturned channel members 30 are securely attached to the mold sections 10 and 11 and serve as supports for a base plate 31. Base plate 31 is provided with a series of holes 32 into which project lugs 33 which extend upwardly from the lower arm of channels 30. Lugs 32 are positioned only on channels mounted on section 10 and serve to limit the transverse movement of the base plate 31. Screws 33 threaded through the channels 30 are adjustable to impinge the upper side of plates 31 and cooperate with said channels to maintain the base plate 31 in a fixed position relative to the axis of the mold.

In order to obtain a proper facing for the inner surface of sections 10 and 11 and also the upper face of the base plate 22, a thin coat of carbon may be burned thereon, thus forming a smooth carbon glaze. This prevents the glass from coming in contact with the iron and also produces a smooth surface thus facilitating the easy rotation of the glass cylinder during the operation of forming.

It is apparent that this invention provides for a mold in which the expansion and contraction of any one of the parts will not tend to warp or distort any other part and one in which the space between the side walls and base plate may be varied to suit the class of work being done.

While I have illustrated and described what is now deemed to constitute the preferred form of embodiment of the invention, I desire to reserve the right to make all such formal changes or modifications as may fairly fall within the scope of the appended claims.

What I claim is:

1. A mold of the character described comprising a pair of semi-cylindrical sections hingedly joined together, and a removable base plate carried adjacent its outer edge by said sections and spaced apart therefrom.

2. A mold of the character described comprising a pair of semi-cylindrical half-sections hingedly joined together, a base plate carried by said half sections, and means to move said base plate towards and from said half-section.

3. A mold of the character described comprising a pair of semi-cylindrical half-sections hingedly joined together, a base plate vertically adjustably carried by said half-sections, said base plate being mounted to permit a limited transverse movement thereof relative to said half-sections.

4. A mold of the character described comprising a pair of elongated semi-cylindrical half-sections hingedly joined together, and a base plate carried by said half-sections and positioned in spaced apart relation therewith, said base plate being mounted for a limited transverse movement relative to said half sections when the mold is in the operative position.

5. A mold of the character described comprising a pair of semi-cylindrical sections hingedly joined together, and a base plate removably carried by said sections and positioned in spaced apart relation therewith, said base plate being adjustable to and from said sections and having a limited relative transverse movement thereto.

6. A mold of the character described comprising a pair of elongated semi-cylindrical half-sections hingedly joined together, means for anchoring one of said half-sections to a support, means for opening and closing the other of said half-sections relative to said anchored half-section, a base plate carried by said half-sections for limited transverse movement therewith.

7. A mold of the character described, comprising a pair of elongated semi-cylindrical cooperating half-sections, one of said half-sections being anchored to a support, means for moving the other of said half-sections to and from the operative position with said anchored half-section, a base plate supported by said anchored half-section for limited transverse movement, means carried by said movable half-section adapted to support said base plate when the half-sections are in cooperative relation.

8. A mold of the character described comprising a pair of semi-cylindrical half sections hingedly joined together, means for securing one of said half-sections to a support, means for oscillating the other of said half-sections relative to the secured half-sections, a base plate carried by said half-sections and spaced apart therefrom, to form an air vent therebetween, said base plate being mounted to permit a limited transverse movement thereof relative to said half sections when the mold is in the closed position, and means for adjusting said base plate to and from said half-sections.

9. A mold of the character described comprising a pair of semi-cylindrical half-sections hingedly joined together, means for securing one of said half-sections to a support, means for oscillating the other of said half-sections relative to the securing half-sections, means for securing said half-sections in the closed position, a base plate carried by said half-sections and spaced apart therefrom to form an air vent therebetween, said base plate being mounted to permit a limited transverse movement thereof relative to said half-sections when the mold is in the closed position, and means for adjusting said base plate to and from said half-sections.

In testimony whereof I hereunto affix my signature.

WILLIAM G. TWYMAN.